(12) United States Patent
Venkatraman et al.

(10) Patent No.: US 9,906,922 B2
(45) Date of Patent: *Feb. 27, 2018

(54) REGION DETERMINATION CONTROL

(71) Applicant: QUALCOMM Incorporated, San Diego, CA (US)

(72) Inventors: Sai Pradeep Venkatraman, Santa Clara, CA (US); Lionel Jacques Garin, Palo Alto, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,782

(22) Filed: Apr. 29, 2016

(65) Prior Publication Data
US 2016/0337813 A1 Nov. 17, 2016

Related U.S. Application Data

(63) Continuation of application No. 13/741,243, filed on Jan. 14, 2013, now Pat. No. 9,357,355.

(51) Int. Cl.
*H04W 24/00* (2009.01)
*H04W 4/04* (2009.01)
(Continued)

(52) U.S. Cl.
CPC .......... *H04W 4/043* (2013.01); *G01C 21/005* (2013.01); *G01C 21/206* (2013.01);
(Continued)

(58) Field of Classification Search
CPC ..... H04W 4/043; H04W 4/026; H04W 4/023; H04W 4/02; H04W 4/025; H04W 4/027; H04W 4/04
See application file for complete search history.

(56) References Cited

U.S. PATENT DOCUMENTS 8,712,713 B2 4/2014 Wolf et al.
9,357,355 B2 5/2016 Venkatraman et al.
(Continued)

FOREIGN PATENT DOCUMENTS

CN 101984643 A 3/2011
WO 2008148785 A1 12/2008
(Continued)

OTHER PUBLICATIONS

International Search Report and Written Opinion—PCT/US2013/074582—ISA/EPO—Apr. 8, 2014—11 pgs.
(Continued)

*Primary Examiner* — Khalid Shaheed
*Assistant Examiner* — K Wilford
(74) *Attorney, Agent, or Firm* — Hunter Clark PLLC

(57) ABSTRACT

A method, in a mobile device, of controlling region determination by the mobile device, includes: determining a present pressure at the mobile device; determining, based on the present pressure and a reference pressure, that the mobile device moved from a first region to a second region within a structure, the first region and the second region being different regions of the structure and vertically displaced from each other; and performing region determination in response to determining that the mobile device moved from the first region to the second region.

30 Claims, 10 Drawing Sheets

(51) Int. Cl.
- *H04W 4/02* (2018.01)
- *H04W 4/22* (2009.01)
- *H04W 64/00* (2009.01)
- *G01C 21/00* (2006.01)
- *G01C 21/20* (2006.01)
- *G01S 5/02* (2010.01)
- *H04W 52/02* (2009.01)

(52) U.S. Cl.
CPC ............ *G01S 5/0289* (2013.01); *H04W 4/02* (2013.01); *H04W 4/023* (2013.01); *H04W 4/22* (2013.01); *H04W 52/0274* (2013.01); *H04W 64/00* (2013.01); *Y02B 60/50* (2013.01)

(56) References Cited

U.S. PATENT DOCUMENTS

| | | | | |
|---|---|---|---|---|
| 2002/0032539 | A1* | 3/2002 | Tsuji | G01C 5/06 702/139 |
| 2005/0176441 | A1 | 8/2005 | Jurecka | |
| 2005/0272447 | A1 | 12/2005 | Eckel | |
| 2009/0143983 | A1* | 6/2009 | Venkatraman | G01C 21/28 701/472 |
| 2009/0286556 | A1* | 11/2009 | Yumoto | G01C 21/20 455/456.6 |
| 2010/0017126 | A1 | 1/2010 | Holcman et al. | |
| 2010/0052896 | A1 | 3/2010 | Goodman | |
| 2012/0072110 | A1 | 3/2012 | Venkatraman | |
| 2012/0264446 | A1 | 10/2012 | Xie et al. | |
| 2014/0065976 | A1 | 3/2014 | Jones et al. | |
| 2014/0200037 | A1* | 7/2014 | Venkatraman | G01C 21/005 455/456.6 |
| 2014/0213308 | A1* | 7/2014 | Matthes | G01W 1/02 455/466 |

FOREIGN PATENT DOCUMENTS

| | | |
|---|---|---|
| WO | 2009104254 A1 | 8/2009 |
| WO | 2012052766 A2 | 4/2012 |
| WO | 2012065184 A2 | 5/2012 |

OTHER PUBLICATIONS

International Preliminary Report on Patentability—PCT/US2013/074582—The International Bureau of WIPO—Rijswijk, The Netherlands—Oct. 1, 2014—19 pgs.

* cited by examiner

REGION DETERMINATION CONTROL

CROSS-REFERENCE TO RELATED APPLICATIONS

This application is a continuation of prior application Ser. No. 13/741,243, filed Jan. 14, 2013, and entitled "REGION DETERMINATION CONTROL," which is assigned to the assignee hereof, and expressly incorporated herein by reference.

BACKGROUND

When performing positioning in an indoor environment, determining a region, including disambiguating between different regions of the indoor environment is useful, if not critical. Indoor regions may be different floors of a building or portions of floors in a building or different portions of a floor. In this case, signals from wireless transceiver access points (APs) in different regions can be received by a single mobile station (MS). Even though the MS is in a first region, the signal strength received from an AP in a second, different, region may be stronger than the signal strength of a signal received from an AP in the first region. This is especially true near portals such as staircases and elevator shafts, e.g., due to waveguide effects of these structures. Consequently, region determination is performed to determine in which region the MS resides. Region determining, including disambiguating between different indoor regions of a structure, can be a time-consuming, highly power-consuming process.

SUMMARY

An example method, in a mobile device, of controlling region determination by the mobile device, includes: determining a present pressure at the mobile device; determining, based on the present pressure and a reference pressure, that the mobile device moved from a first region to a second region within a structure, the first region and the second region being different regions of the structure and vertically displaced from each other; and performing region determination in response to determining that the mobile device moved from the first region to the second region.

Implementations of such a method may include one or more of the following features. The determining that the mobile device moved from the first region to the second region within the structure includes: determining a present altitude based on the present pressure and the reference pressure; and making a comparison between the present altitude and a reference altitude associated with a reference region that is a region of the structure in which the mobile device was most-recently determined to be; where the region determination is performed in response to the comparison being indicative of the mobile device being outside the reference region. The region determination is performed in response to the present altitude differing from the reference altitude by more than a region-change-indicative magnitude.

Implementations of the example method may include one or more of the following features. The determining that the mobile device moved from the first region to the second region within the structure includes: determining a present altitude based on the present pressure and the reference pressure; and making a comparison between the present altitude and a reference altitude associated with a reference region that is a fixed region of the structure; where the region determination is performed in response to the comparison being indicative of the mobile device being outside a region of the structure in which the mobile device was most-recently determined to be. The region determination is performed in response to a first difference differing by more than a region-change-indicative magnitude from a second difference, the first difference being between the present altitude and the reference altitude, and the second difference being between (1) a previously-determined altitude at the mobile device associated with the region of the structure in which the mobile device was most-recently determined to be and (2) the reference altitude.

Implementations of the example method may include one or more of the following features. The method further includes: determining a position of the mobile device; and in response to the position of the mobile device being in an area of unreliable pressure measurements, either (1) disregarding the present pressure or (2) disregarding a present altitude determined from the present pressure. The method further includes reducing a frequency of passive measurements by the mobile device in response to determining that the mobile device is unlikely to move between regions of the structure soon. The determining that the mobile device is unlikely to move between regions of the structure soon comprises determining that a present position of the mobile device is displaced from a vertical transition of the structure by more than a threshold distance. The method further includes turning off recurring passive measurements by the mobile device in response to determining that the mobile device is displaced from a vertical transition of the structure by more than a threshold distance. The method further includes performing a passive measurement in response to the mobile device having moved from being in the first region to being in the second region. The mobile device is configured to perform passive measurements at a first rate or a second rate, with the first rate being higher than the second rate, the method further comprising setting a rate of passive measurements by the mobile device to the first rate, in response to determining at least one of that the mobile device is within a threshold distance of a vertical transition of the structure or that the mobile device moved from being in the first region to being in the second region.

An example of a mobile device includes: a pressure sensor configured to measure a present pressure at the mobile device; and a region determination module configured to: determine, based on the present pressure and a reference pressure, that the mobile device moved from a first region to a second region within a structure, the first region and the second region being different regions of the structure and vertically displaced from each other; and perform region determination in response to determining that the mobile device moved from the first region to the second region.

Implementations of such a mobile device may include one or more of the following features. To determine that the mobile device moved from the first region to the second region, the region determination module is configured to: determine a present altitude based on the present pressure and the reference pressure; and make a comparison between the present altitude and a reference altitude associated with a reference region that is a region of the structure in which the mobile device was most-recently determined to be; where the region determination module is configured to perform the region determination in response to the comparison being indicative of the mobile device being outside the reference region. The region determination module is configured to perform the region determination in response to the present altitude differing from the reference altitude by more than a region-change-indicative magnitude.

Implementations of the example mobile device may include one or more of the following features. To determine that the mobile device moved from the first region to the second region, the region determination module is configured to: determine a present altitude based on the present pressure and the reference pressure; and make a comparison between the present altitude and a reference altitude associated with a reference region that is a fixed region of the structure; where the region determination module is configured to perform the region determination in response to the comparison being indicative of the mobile device being outside a region of the structure in which the mobile device was most-recently determined to be. The region determination module is configured to perform the region determination in response to a first difference differing by more than a region-change-indicative magnitude from a second difference, the first difference being between the present altitude and the reference altitude, and the second difference being between (1) a previously-determined altitude at the mobile device associated with the region of the structure in which the mobile device was most-recently determined to be and (2) the reference altitude.

Implementations of the example mobile device may include one or more of the following features. The mobile device further includes a position module configured to determine a position of the mobile device, where in response to the position of the mobile device being in an area of unreliable pressure measurements, either (1) disregarding the present pressure or (2) disregarding a present altitude determined from the present pressure. The mobile device further includes a measurement module configured to reduce a frequency of passive measurements in response to the mobile device being unlikely to move between regions of the structure soon. The mobile device is unlikely to move between regions of the structure soon if a present position of the mobile device is displaced from a vertical transition of the structure by more than a threshold distance. The mobile device further includes a measurement module configured to turn off recurring passive measurements in response to the mobile device being displaced from a vertical transition of the structure by more than a threshold distance. The measurement module is configured to perform a passive measurement in response to the mobile device having moved from being in the first region to being in the second region. The mobile device further includes a measurement module configured to set a rate of passive measurements to a first rate or a second rate, with the first rate being higher than the second rate, and to set the rate of passive measurements to the first rate in response to the mobile device being within a threshold distance of a vertical transition of the structure or the mobile device having moved from being in the first region to being in the second region.

Another example of a mobile device includes: a pressure sensor configured to measure a present pressure at the mobile device; and means for determining region for: determining, based on the present pressure and a reference pressure, that the mobile device moved from a first region to a second region within a structure, the first region and the second region being different regions of the structure and vertically displaced from each other; and performing region determination in response to determining that the mobile device moved from the first region to the second region.

Implementations of such a mobile device may include one or more of the following features. For determining that the mobile device moved from the first region to the second region, the means for determining region include means for: determining a present altitude based on the present pressure and the reference pressure; and making a comparison between the present altitude and a reference altitude associated with a reference region that is a region of the structure in which the mobile device was most-recently determined to be; where the means for determining region are configured to perform the region determination in response to the comparison being indicative of the mobile device being outside the reference region. The means for determining region are configured to perform the region determination in response to the present altitude differing from the reference altitude by more than a region-change-indicative magnitude.

Implementations of the example mobile device may include one or more of the following features. For determining that the mobile device moved from the first region to the second region, the means for determining region include means for: determining a present altitude based on the present pressure and the reference pressure; and making a comparison between the present altitude and a reference altitude associated with a reference region that is a fixed region of the structure; where the means for determining region are configured to perform the region determination in response to the comparison being indicative of the mobile device being outside a region of the structure in which the mobile device was most-recently determined to be. The means for determining region are configured to perform the region determination in response to a first difference differing by more than a region-change-indicative magnitude from a second difference, the first difference being between the present altitude and the reference altitude, and the second difference being between (1) a previously-determined altitude at the mobile device associated with the region of the structure in which the mobile device was most-recently determined to be and (2) the reference altitude.

Implementations of the example mobile device may include one or more of the following features. The mobile device further includes means for determining position for determining a position of the mobile device; where the means for determining region are configured to, in response to the position of the mobile device being in an area of unreliable pressure measurements, either (1) disregard the present pressure or (2) disregard a present altitude determined from the present pressure. The mobile device further includes means for measuring including means for reducing a frequency of passive measurements in response to the mobile device being unlikely to move between regions of the structure soon. The mobile device is unlikely to move between regions of the structure soon if a present position of the mobile device is displaced from a vertical transition of the structure by more than a threshold distance. The mobile device further includes means for measuring including means for turning off recurring passive measurements in response to the mobile device being displaced from a vertical transition of the structure by more than a threshold distance. The means for measuring are configured to perform a passive measurement in response to the mobile device having moved from being in the first region to being in the second region. The mobile device further includes means for measuring including means for setting a rate of passive measurements to a first rate or a second rate, with the first rate being higher than the second rate, and for setting the rate of passive measurements to the first rate in response to the mobile device being within a threshold distance of a vertical transition of the structure or the mobile device having moved from being in the first region to being in the second region.

An example of a processor-readable storage medium of a mobile device includes processor-readable instructions configured to cause a processor to: determine, based on a reference pressure and a present pressure measured by a pressure sensor, that the mobile device moved from a first region to a second region within a structure, the first region and the second region being different regions of the structure and vertically displaced from each other; and perform region determination in response to determining that the mobile device moved from the first region to the second region.

Implementations of such a storage medium may include one or more of the following features. To determine that the mobile device moved from the first region to the second region, the instructions are configured to cause the processor to: determine a present altitude based on the present pressure and the reference pressure; and make a comparison between the present altitude and a reference altitude associated with a reference region that is a region of the structure in which the mobile device was most-recently determined to be; where the instructions are configured to cause the processor to perform the region determination in response to the comparison being indicative of the mobile device being outside the reference region. The instructions are configured to cause the processor to perform the region determination in response to the present altitude differing from the reference altitude by more than a region-change-indicative magnitude.

Implementations of the example storage medium may include one or more of the following features. To determine that the mobile device moved from the first region to the second region, the instructions are configured to cause the processor to: determine a present altitude based on the present pressure and the reference pressure; and make a comparison between the present altitude and a reference altitude associated with a reference region that is a fixed region of the structure; where the instructions are configured to cause the processor to perform the region determination in response to the comparison being indicative of the mobile device being outside a region of the structure in which the mobile device was most-recently determined to be. The instructions are configured to cause the processor to perform the region determination in response to a first difference differing by more than a region-change-indicative magnitude from a second difference, the first difference being between the present altitude and the reference altitude, and the second difference being between (1) a previously-determined altitude at the mobile device associated with the region of the structure in which the mobile device was most-recently determined to be and (2) the reference altitude.

Implementations of the example storage medium may include one or more of the following features. The storage medium further includes instructions configured to cause the processor to determine a position of the mobile device; where the instructions are configured to cause the processor to, in response to the position of the mobile device being in an area of unreliable pressure measurements, either (1) disregard the present pressure or (2) disregard a present altitude determined from the present pressure. The storage medium further includes instructions configured to cause the processor to reduce a frequency of passive measurements in response to the mobile device being unlikely to move between regions of the structure soon. The mobile device is unlikely to move between regions of the structure soon if a present position of the mobile device is displaced from a vertical transition of the structure by more than a threshold distance. The storage medium further includes instructions configured to cause the processor to turn off recurring passive measurements in response to the mobile device being displaced from a vertical transition of the structure by more than a threshold distance. The instructions are configured to cause the processor to perform a passive measurement in response to the mobile device having moved from being in the first region to being in the second region. The storage medium further includes instructions configured to cause the processor to set a rate of passive measurements to a first rate or a second rate, with the first rate being higher than the second rate, and to set the rate of passive measurements to the first rate in response to the mobile device being within a threshold distance of a vertical transition of the structure or the mobile device having moved from being in the first region to being in the second region.

Items and/or techniques described herein may provide one or more of the following capabilities, as well as other capabilities not mentioned. Location determination within a structure may be achieved using less power than with prior techniques. Passive measurements by a mobile device in a structure may be reduced, thereby reducing power consumption of the mobile device. Anomalous region determination triggers may be ignored to help conserve power. Operation of a pressure sensor may be controlled based on knowledge of connectivity of a region, e.g., to reduce power consumption. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTIONS OF THE DRAWINGS

DETAILED DESCRIPTION

Techniques are provided for determining location within a structure, e.g., initiating position determining and/or signal measurements in a structure. For example, determining a region containing a mobile device, including disambiguation between multiple possible regions as appropriate, can be triggered in response to detecting a pressure change indicative of a floor change. Further, signal measurements such as passive measurements for access point signals can be triggered in response to detecting a pressure change indicative of a floor change. Pressure information measured at the mobile device is used by the mobile device to initiate region determination. The mobile device converts the pressure to altitude and uses knowledge of the structure, e.g., a map of the regions, and the determined altitude to determine when to initiate region determination, e.g., in response to a change in altitude exceeding a threshold. The mobile device may ignore some pressure readings, e.g., if the mobile device is in an area of unreliable pressure measurements (e.g., an area of the structure 20 known to have unreliable pressure readings, e.g., transient pressure readings). Other techniques are also possible.

Figure 1:
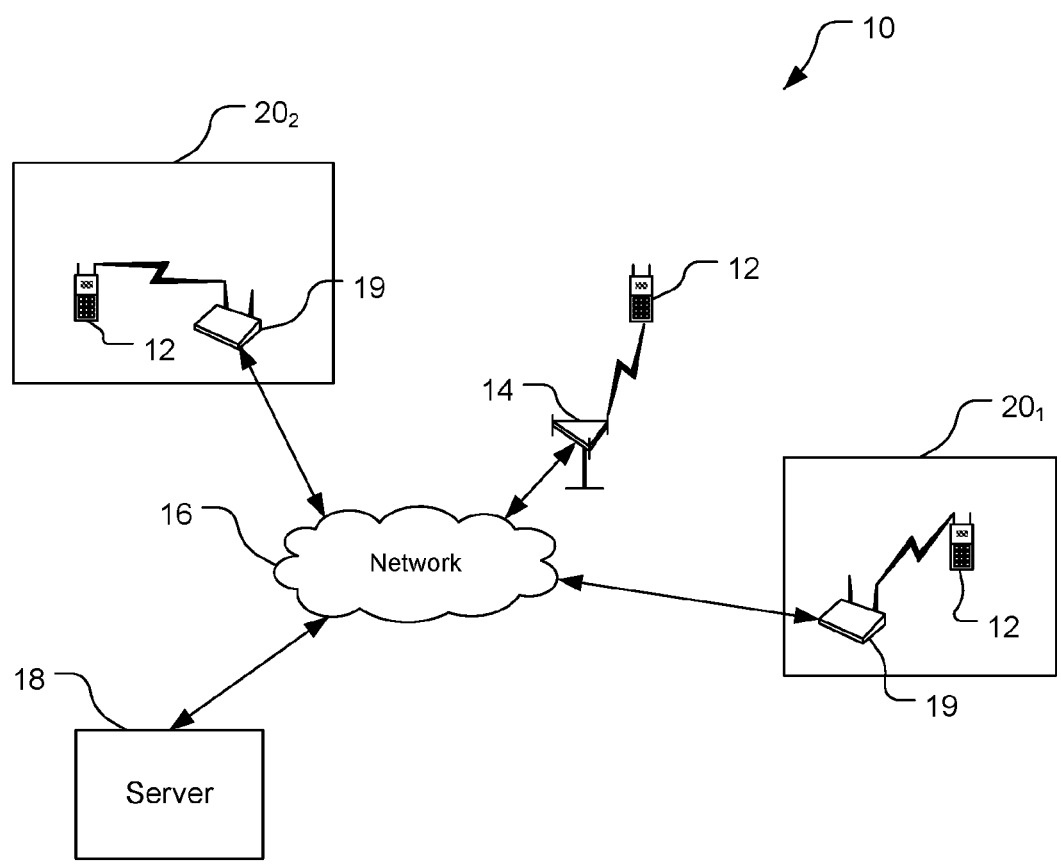
FIG. 1 is a simplified diagram of a communication system.
Figure 2:
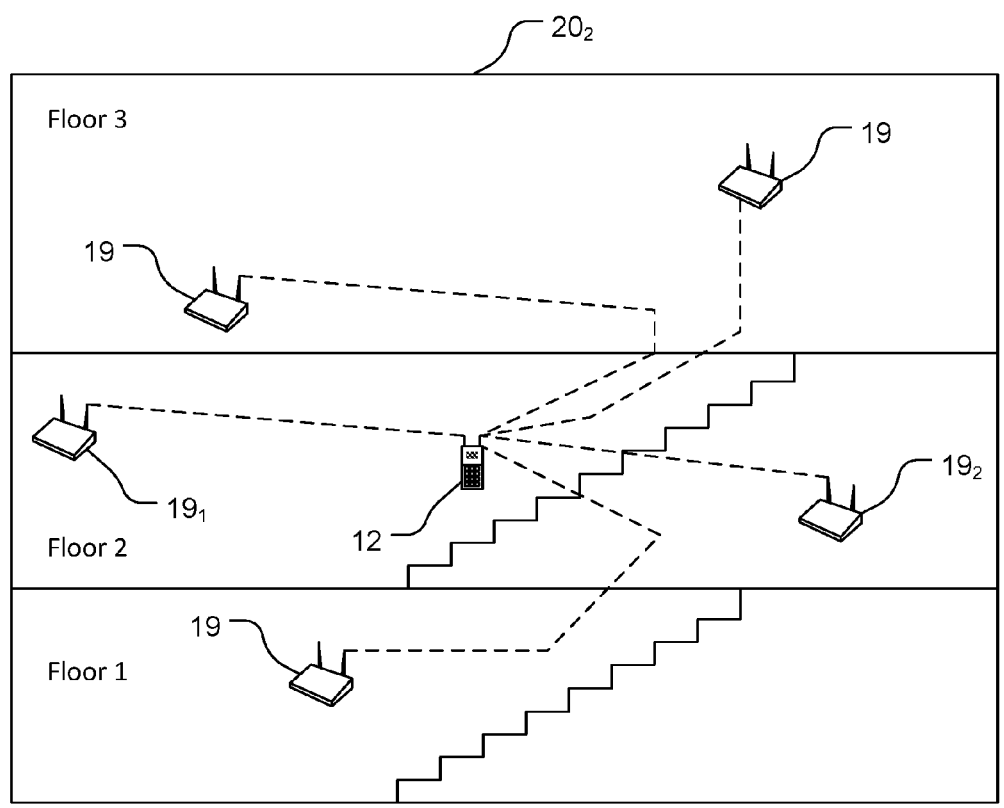
FIG. 2 is a simplified diagram of access points and a mobile device in a structure shown in FIG. 1.

Referring to FIGS. 1-2, a communication system 10 includes mobile devices 12, a base transceiver station (BTS) 14, a network 16, a server 18, and wireless transceiver access points (APs) 19 disposed in structures (here buildings) 20. The system 10 is a communication system in that the system 10 can at least send and receive communications. Although only one server 18 is shown for simplicity, more than one server 18 may be used in the system 10, e.g., in various locations to provide quicker access as the system 10 may span large regions, e.g., entire countries or continents, or even the planet.

The BTS 14 can wirelessly communicate with the mobile devices 12 via antennas. Each of the BTSs 14 may also be referred to as an access point, an access node (AN), a Node B, an evolved Node B (Enb), etc. The BTSs 14 are configured to communicate wirelessly with the mobile devices 12 under the control of the server 18 (via the network 16).

The mobile devices 12 can be moved to various locations, including into the structures 20 and onto different floors of the structures 20. The mobile devices 12 may be referred to as access terminals (ATs), mobile stations, user equipment (UE), or subscriber units. The mobile devices 12 are shown here as cellular phones. Other examples of mobile devices include wireless routers, personal digital assistants (PDAs), netbooks, notebook computers, tablet computers, etc. Only one mobile device 12 is shown in FIG. 2, and to simplify the discussion below only this mobile device 12 is discussed.

Figure 3:
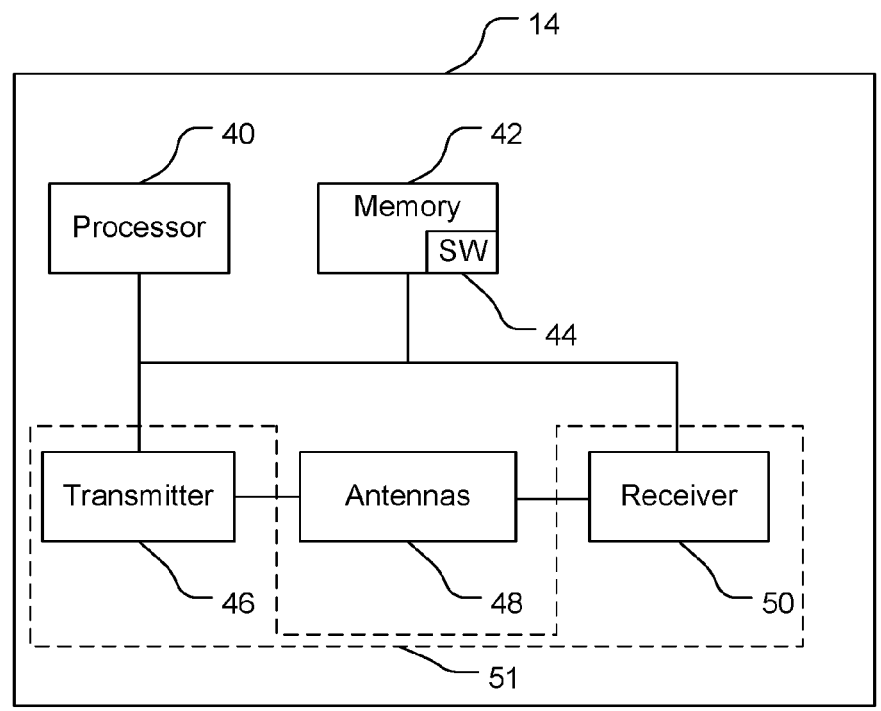
FIGS. 3-6 are block diagrams of a base station, a server shown in FIG. 1, one of the access points shown in FIG. 2, and the mobile device shown in FIG. 2.

Referring also to FIG. 3, the BTS 14 comprises a computer system including a processor 40, memory 42 including software 44, a transmitter 46, antennas 48, and a receiver 50. While the BTS 14 is shown with a single processor 40 and a single memory 42 (with corresponding software 44), the BTS 14 may have a processor 40 and a memory 42 (with corresponding software 44) for each sector served by the BTS 14, e.g., each of three sectors. The transmitter 46, the antennas 48, and the receiver 50 form a wireless communication module (with the transmitter 46 and the receiver 50 being a transceiver 51) in the BTS 14. The transmitter 46 and the receiver 50 are configured to communicate bi-directionally with the mobile device 12 via a corresponding antenna 48. The processor 40 is preferably an intelligent hardware device, e.g., a central processing unit (CPU) such as those made by ARM®, Intel® Corporation, or AMD®, a microcontroller, an application specific integrated circuit (ASIC), etc. The processor 40 could comprise multiple separate physical entities that can be distributed in the BTS 14. The memory 42 includes random access memory (RAM) and read-only memory (ROM). The memory 42 is a processor-readable storage medium that stores the software 44 which is processor-readable, processor-executable software code containing processor-readable instructions that are configured to, when executed, cause the processor 40 to perform various functions described herein (although the description may refer only to the processor 40 performing the functions). Alternatively, the software 44 may not be directly executable by the processor 40, but configured to cause the processor 40, e.g., when compiled and executed, to perform the functions.

The mobile device 12 and the BTS 14 are configured to communicate with each other. The mobile device 12 and the BTS 14 can send messages to each other that contain a variety of information. For example, the BTS 14 can collect information from mobile devices 12 and/or from the server 18 and send an altitude map of regional altitude indications and corresponding region indications to the mobile device 12 either directly or through one or more of the APs 19. The regional altitude indications may indicate differential altitudes. The differential altitudes may be for each region relative to a single, common region such as the ground floor or the top floor of the structure 20. Also or alternatively, the differential altitudes may be altitude differentials between each region and multiple other regions (e.g., multiple entrance regions, every other region). Also or alternatively, the differential altitudes may include altitude differences between adjacent floors, i.e., between floor n and floor n+1 for n=1 to N−1, where the $N^{th}$ floor is the top floor. The BTS 14 may be configured to send the regional altitude indications and corresponding region indications in broadcast messages or in a dedicated message as part of an on-going communication with the mobile device 12 specifically.

Figure 4:
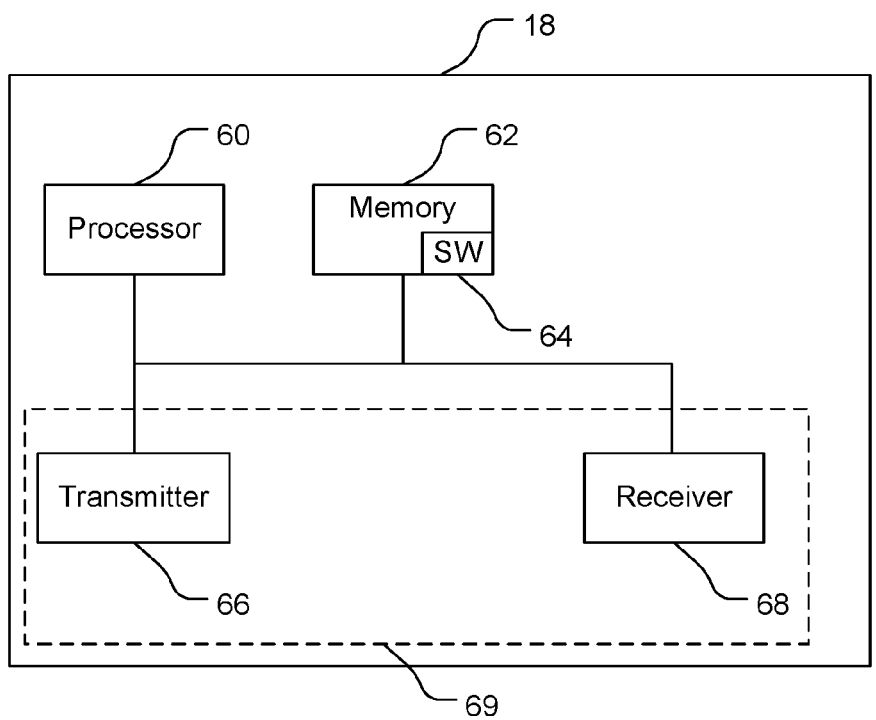

Referring to FIG. 4, the server 18 comprises a computer system including a processor 60, memory 62 including software 64, a transmitter 66, and a receiver 68. The processor 60 is preferably an intelligent hardware device, e.g., a central processing unit (CPU) such as those made by ARM®, Intel® Corporation, or AMD®, a microcontroller, an application specific integrated circuit (ASIC), etc. The processor 60 could comprise multiple separate physical entities that can be distributed in the server 18. The memory 62 includes random access memory (RAM) and read-only memory (ROM). The memory 62 is a processor-readable storage medium that stores the software 64 which is processor-readable, processor-executable software code containing processor-readable instructions that are configured to, when executed, cause the processor 60 to perform various functions described herein (although the description may refer only to the processor 60 performing the functions). Alternatively, the software 64 may not be directly executable by the processor 60 but configured to cause the processor 60, e.g., when compiled and executed, to perform the functions. The transmitter 66 and the receiver 68 (together a transceiver 69) are configured to send communications to and receive communications from the BTS 14 through the network 16. The APs 19 are typically hard-wire connected to the network 16.

The server 18 may provide map information to the mobile device 12 through the network 16 and one or more of the APs 19. The map information provides a layout of the structure $20_2$ along with locations of the various APs 19, and indications of areas (e.g., portions of floors) of unreliable pressure. For example, areas near a vent may cause pressure in the area to differ from the pressure surrounding this area to such a degree that if the mobile device 12 uses measured pressure in this area, then the mobile device 12 may incorrectly determine that the mobile device 12 has likely changed floors.

Figure 5:
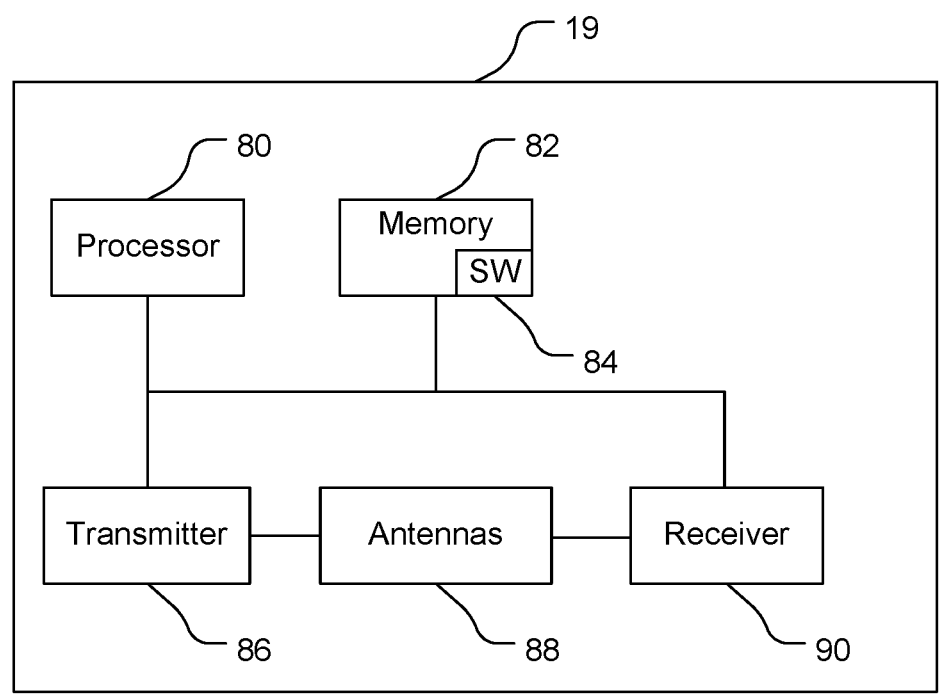

Referring to FIG. 5, an example of one of the APs 19 comprises a computer system including a processor 80, memory 82 including software 84, a transmitter 86, antennas 88, and a receiver 90. The transmitter 86, antennas 88, and the receiver 90 form a wireless communication module (with the transmitter 86 and the receiver 90 being a transceiver). The transmitter 86 is connected to one of the antennas 88 and the receiver 90 is connected to another of the antennas 88. Other example WTs may have different configurations, e.g., with only one antenna 88, and/or with multiple transmitters 86 and/or multiple receivers 90. The transmitter 86 and the receiver 90 are configured such that the AP 19 can communicate bi-directionally with the mobile device 12 via the antennas 88. The processor 80 is preferably an intelligent hardware device, e.g., a central processing unit (CPU) such as those made by ARM®, Intel® Corporation, or AMD®, a microcontroller, an application specific integrated circuit (ASIC), etc. The processor 80 could comprise multiple separate physical entities that can be distributed in the AP 19. The memory 82 includes random access memory (RAM) and read-only memory (ROM). The memory 82 is a processor-readable storage medium that stores the software 84 which is processor-readable, processor-executable software code containing processor-readable instructions that are configured to, when executed, cause the processor 80 to perform various functions described herein (although the description may refer only to the processor 80 performing the functions). Alternatively, the software 84 may not be directly executable by the processor 80 but configured to cause the processor 80, e.g., when compiled and executed, to perform the functions.

Figure 6:
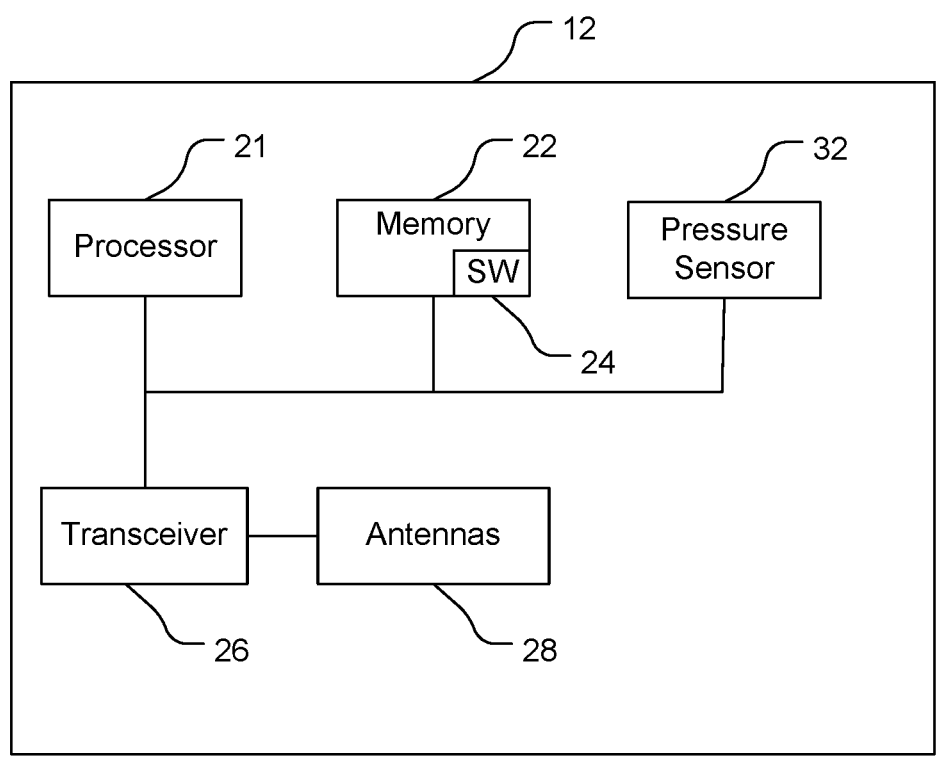

Referring to FIG. 6, the mobile device 12 comprises a computer system including a processor 21, memory 22 including software 24, a transceiver 26, antennas 28, receivers 30, and a pressure sensor 32. The transceiver 26 and antennas 28 form a wireless communication module that can communicate bi-directionally with the BTS 14 and with the APs 19 and/or another entity. Thus, the antennas 28 include an antenna for communicating with the BTS 14 and an antenna for communicating with the APs 19, and the transceiver 26 includes multiple transceivers, one for communicating with the BTS 14 and one for communicating with the APs 19. The antennas 28 may include a satellite positioning system (SPS) antenna for receiving SPS signals and the transceiver 26 may include an SPS receiver for processing and transferring the SPS signals to the processor 21. The processor 21 is preferably an intelligent hardware device, e.g., a central processing unit (CPU) such as those made by ARM®, Intel® Corporation, or AMD®, a microcontroller, an application specific integrated circuit (ASIC), etc. The processor 21 could comprise multiple separate physical entities that can be distributed in the mobile device 12. The memory 22 includes random access memory (RAM) and read-only memory (ROM). The memory 22 is a processor-readable storage medium that stores the software 24 which is processor-readable, processor-executable software code containing processor-readable instructions that are configured to, when executed, cause the processor 21 to perform various functions described herein (although the description may refer only to the processor 21 performing the functions). Alternatively, the software 24 may not be directly executable by the processor 21 but configured to cause the processor 21, e.g., when compiled and executed, to perform the functions.

Figure 7:
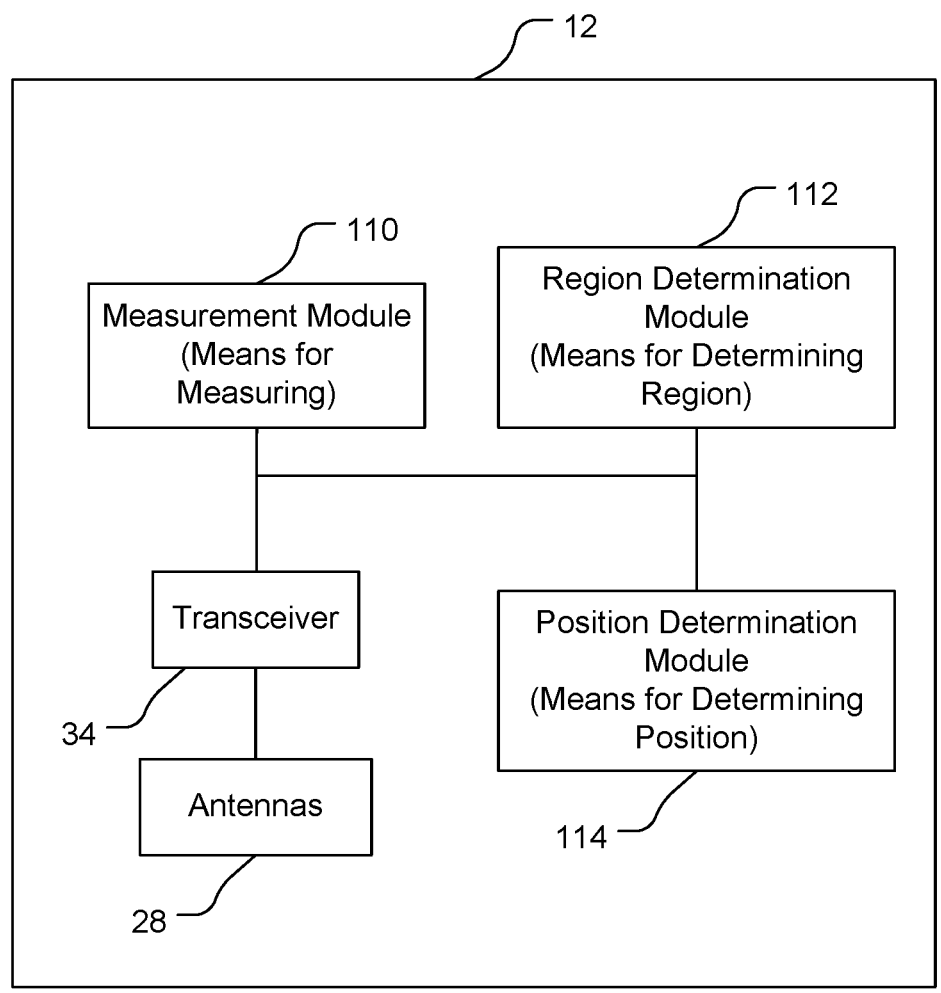
FIG. 7 is a functional block diagram of the mobile device shown in FIG. 6.

Referring to FIG. 7, the mobile device 12 includes a measurement module (means for measuring) 110, a region determination module (means for determining region) 112, and a position determination module (means for determining position) 114. The modules 110, 112, 114 are functional modules implemented by the processor 21 and the software 24 stored in the memory 22. Thus, reference to any of the modules 110, 112, 114 performing or being configured to perform a function is shorthand for the processor 21 performing or being configured to perform the function in accordance with the software 24 (and/or firmware, and/or hardware of the processor 21). Similarly, reference to the processor 21 performing a measuring, region determination, or position determination function, is equivalent to the measurement module 110, the region determination module 112, or the position determination module 114, respectively, performing the function. The measurement module 110 is configured to obtain pressure measurements, convert these measurements to altitudes, and initiate region determination by the region determination module 112. The region determination module 112 is configured to determine a region of the structure 20 containing the mobile device 12, including being configured to disambiguate a region of the structure 20 if appropriate, e.g., if signals are received by the mobile device 12 from APs 19 in different regions. The position determination module 114 is configured to determine a position (location) of the mobile device 12 within a region of the structure 20.

The measurement module 110 is configured to repeatedly measure pressure, e.g., periodically. The measurement module 110 causes the pressure sensor 32 to measure the present pressure at the mobile device 12. The measurement module 110 converts this pressure to an altitude and stores the altitude in the memory 22. The measurement module 110 converts pressure to altitude using an arbitrary reference pressure (e.g., that may be measured such as at power-up of the mobile device 12, or may be pre-programmed and stored in the memory 22, or otherwise arbitrarily selected). Thus, the determined altitude may not reflect an actual altitude, e.g., above sea level, but is determined for use in relative altitude comparisons. The measurement module 110 includes a filter, e.g., a low-pass Kalman filter, that filters the determined altitudes. The measurement module 110 further can track a variance of the filtered determined altitudes and determine whether the variance over a time window, e.g., 15 seconds (although other window durations may be used), indicates that the determined altitude is stable, e.g., the variance is less than, or less than or equal to, a variance threshold such as 0.1 m (although other thresholds may be used). If the determined altitude is stable (e.g., variance less than or equal to the threshold over the entire time window), then the measurement module 110 stores the altitude in the memory 22 as a reference altitude. Otherwise, e.g., if the variance indicates a non-stable altitude (e.g., the variance exceeds, or meets or exceeds, the threshold or the time window has not been reached since the last reliable region disambiguation), then the module continues to determine the altitude without storing a reference altitude. With a reference altitude stored in the memory 22, the measurement module 110 compares (makes a comparison of) the present altitude with the reference altitude and determines whether a difference between the present altitude and the reference altitude is high (large) enough to indicate that the mobile device 12 has changed or likely has changed regions in the structure 20, e.g., if the altitude differential exceeds (or meets or exceeds) a threshold value. The threshold value may be any of a variety of values, and may be fixed or variable (e.g., vary as a function of time and/or location, etc.). For example, the threshold may be a fixed value for all structures 20, may be a fixed value within any particular structure 20 (e.g., based on information received from an AP 19 in the structure 20, e.g., as part of map information for the structure), may be different for different present (most-recently determined) regions of the structure (e.g., based on information received from an AP 19 of the structure, e.g., where floors are separated by different heights and/or split-level floors are present), etc. Alternatively, instead of storing a reference altitude and comparing (making a comparison of) a present altitude with the reference altitude, the measurement module 110 may analyze a rate of change of the altitude over the time window. The measurement module 110 determines whether the absolute value of the rate of altitude change is high (large) enough to indicate that the mobile device 12 has changed or likely has changed regions in the structure 20 (e.g., is greater than, or is equal to or greater than, a threshold rate). If, in any case, the module determines that the mobile device 12 has changed or likely has changed regions in the structure 20, then the measurement module 110 will trigger a position determination and disambiguation, if appropriate, by sending an indication to the position/disambiguation module 112 to determine the position of the mobile device 12.

The measurement module 110 is further configured to take measurements to obtain information for use by the region determination module 112 and the position determination module 114. For example, the measurement module 110 can perform passive measurements to obtain signal measurements constituting positioning information (e.g., RSSI (received signal strength indication), RTT (round-trip time)). The passive measurement is a measurement in which the mobile device 12 measures or listens on each channel on which the APs 19 and the mobile device 12 are configured to communicate. The mobile device 12 will measure an RSSI for each AP signal that it hears and store information (e.g., identity, locations) for each such AP 19 for use in other measurements. The device 12 can, for example, read beacon frames transmitted by the APs 19 and the mobile device 12 dwells about 100 ms (plus some delta time) for each channel to hear the beacon frames for all APs 19 sending beacon frames on the respective channel. The mobile device 12 is configured to determine or elicit, from the passive measurement (e.g., of the beacon signals), information that indicates APs 19 that are good candidates for active measurements to obtain information for use in determining a region and/or a position of the mobile device 12.

The measurement module 110 can perform the passive measurements on a recurring basis, e.g., at regular periodic intervals, or at non-regular intervals, or combinations of these. The frequency of passive measurements performed by the measurement module 110 may be changed over time. For example, the position determination module 114 may cause the measurement module to perform passive measurements at a relatively high frequency if the mobile device 12 is near (e.g., within a threshold distance of) a vertical transition in the structure 20, or not to perform the passive measurements or to perform the passive measurements at a relatively low frequency if the mobile device 12 is not near (e.g., beyond a threshold distance of) a vertical transition in the structure 20. The measurement module 110 may perform the passive measurements at regular intervals, with a constant frequency, or at irregular intervals (e.g., random intervals, pseudo-random intervals, regularly-changing (e.g., increasing or decreasing) intervals, combinations of one or more of these, etc.).

The region determination module 112 can determine a region of the structure 20 containing the mobile device 12 and the position determination module 114 can determine a position of the mobile device 12. The position determination module 114 can perform trilateration using the signal measurements to determine the mobile device's position in a region, e.g., using RSSI and/or RTT measurements taken by the measurement module 110, and known locations of the APs 19. The region determination module 112 can disambiguate between multiple possible disambiguation regions (e.g., floors) within the structure 20. Thus, the region determination module 112 can determine a region containing the mobile device 12, and can disambiguate between regions in the structure 20 as appropriate, e.g., where position may be ambiguous due to receipt of signals from APs 19 in different regions, and the position determination module 114 can use location assistance data for that region to perform position determination. Indeed, the position determination module 112 may load the location assistance data for a particular region into the memory 22, in response to the region determination module 112 determining the region in which the mobile device 12 resides, and then use the loaded assistance data to determine the position of the mobile device 12 within that particular region. The position determination module 114 may even obtain the location assistance data for the particular region only in response to the region determination module 112 determining that the mobile device 12 presently resides in the particular region.

The region determination module 112 may work with the measurement module 110 to control operation of the pressure sensor 32. For example, in response to the region determination module 112 determining that the structure 20 in which the mobile device 12 presently resides has only a single region, e.g., a one-story structure 20 with no vertical transitions, the region determination module 112 can send an indication to the measurement module 110 to turn the pressure sensor 32 off. The region determination module 112 may determine that the structure 20 has only a single region, for example, by examining information provided to the region determination module 112 in a map, or by a disambiguation process returning only a single candidate region. The region determination module 112 can indicate to the measurement module 110 to turn the pressure sensor 32 on, e.g., in response to transitioning to a different structure or in response to more than one candidate region being found during disambiguation.

Figure 8:
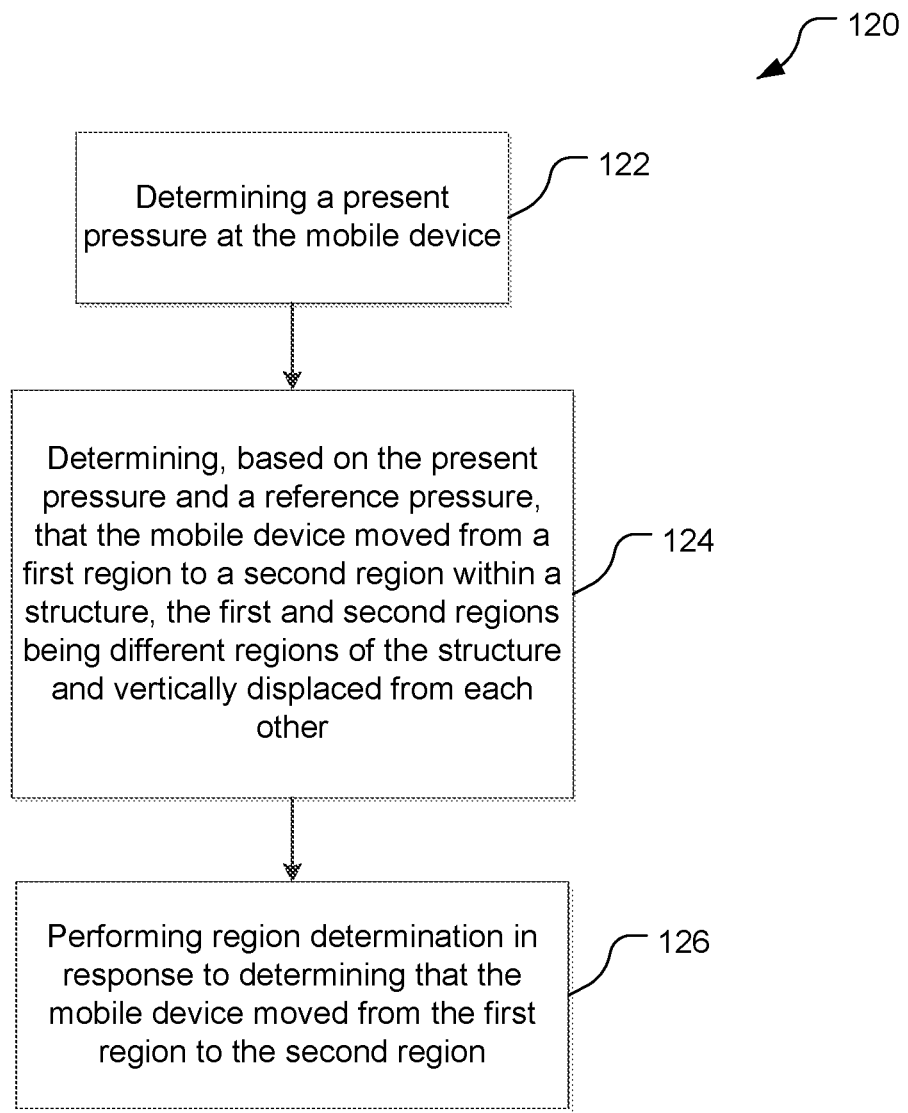
FIG. 8 is a block flow diagram of a process of obtaining and using pressure information to trigger region determination of a mobile device location.

Referring to FIG. 8, with further reference to FIGS. 1-7, a process 120, in the mobile device 12, of controlling region determination by the mobile device 12 while within the structure $20_2$ includes the stages shown. The process 120 is, however, an example only and not limiting. The process 120 can be altered, e.g., by having stages altered, added, removed, combined, and/or performed concurrently.

At stage 122, the process 120 includes determining a present pressure at the mobile device 12. The pressure sensor 32 measures the present pressure at the mobile device 12 and provides an indication of this pressure to the processor 21. The processor 21 converts this pressure to an altitude using a reference pressure. The mobile device 12 may be configured such that the pressure sensor 32 passively measures the pressure or may be configured such that the pressure sensor 32 actively measures the pressure in response to a command from the processor 21 in accordance with the software 24.

At stage 124, the process 120 includes determining, based on the present pressure and a reference pressure, that the mobile device 12 moved from a first region to a second region of the structure 20. The mobile device 12 determines that the mobile device 12 moved from a first region of the structure $20_2$ to a second region of the structure $20_2$. The mobile device 21 makes a comparison of the present altitude and a reference altitude stored in the memory 22, with the reference altitude being based on a pressure at a reference region and the reference pressure. The reference altitude may be the altitude at the mobile device 12 associated with a reference region that is a region of the structure $20_2$ in which the mobile device 12 was most-recently determined to be, i.e., the region determined in a most-recent region determination. In this case, the reference region, and reference altitude, are variable and may change over time depending upon the movement of the mobile device 12 within the structure $20_2$. Alternatively, the reference region may be a fixed region such as a ground floor, here Floor 1, of the structure $20_2$. In this case, the reference altitude may be fixed/non-variable, at least for a specified time.

At stage 126, the process 120 includes performing region determination. The mobile device 12 performs region determination in response to (e.g., triggered by) determining that the mobile device moved from the first region to the second region. Here, the region determination module 112 performs region determination in response to the comparison of the present altitude and the reference altitude being indicative of the mobile device 12 having moved from being in the first region of the structure $20_2$ to being in the second region of the structure $20_2$. To determine the region of the structure $20_2$ in which the mobile device 12 resides, the processor 21 uses known techniques to communicate with the APs and, if appropriate, uses known techniques to disambiguate between regions of the structure $20_2$, e.g., using passive and/or active measurements involving the APs 19. For example, if the reference altitude is the altitude of the last (most-recently) determined region, then the comparison is indicative of a change in region if a difference between the present altitude and the reference altitude exceeds a threshold. This example is depicted in each of FIGS. 9 and 11 discussed below. As another example, the reference altitude is fixed and the comparison is indicative of a change in region if a first difference, between the present altitude and the reference altitude, differs from a second difference by more than a threshold. In this example, the second difference is between a previously-determined present altitude (e.g., an altitude associated with a most-recently determined/disambiguated region, i.e., the region of the structure 20 in which the mobile device 12 was most-recently determined to be) and the reference altitude. This example technique could be used as the inquiry of stage 170 discussed below with respect to FIGS. 9 and 11.

Figure 9:
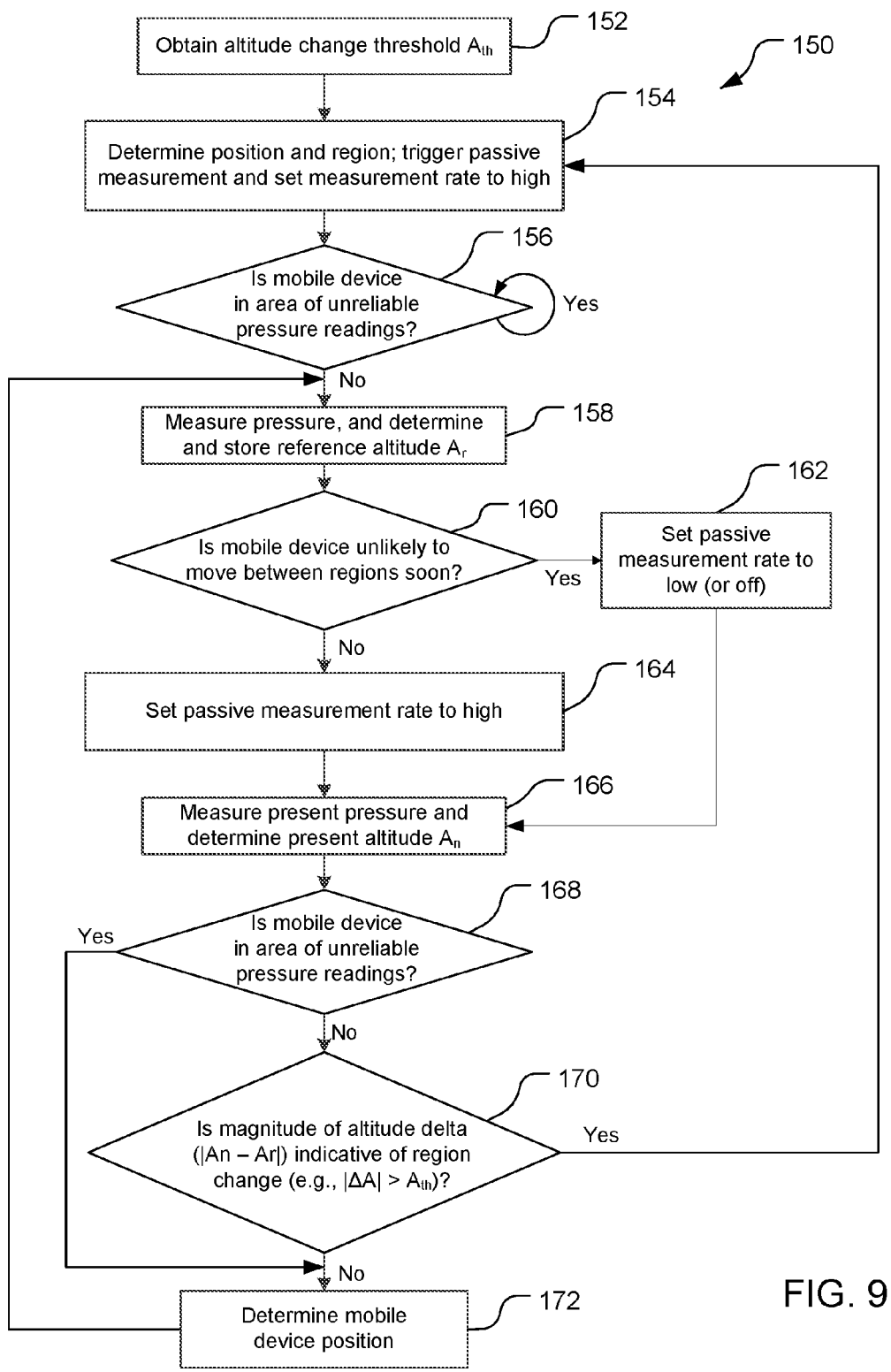
FIG. 9 is a block flow diagram of a process of controlling region determination.

Referring to FIG. 9, with further reference to FIGS. 1-8, a process 150 of controlling region determination (including disambiguation) by the mobile device 12 while within the structure $20_2$ includes the stages shown. The process 150 is an example detailed implementation of the process 120. The process 150 is, however, an example only and not limiting. The process 150 can be altered, e.g., by having stages altered, added, removed, rearranged, combined, and/or performed concurrently. For example, stage 152 could be eliminated.

At stage 152, the mobile device 12 obtains an altitude threshold $A_{th}$. The altitude threshold $A_{th}$ may be structure dependent, or structure independent, e.g., programmed during manufacture of the mobile device 12. The altitude threshold $A_{th}$ may be obtained by the mobile device 12 communicating with at least one of the APs 19 (e.g., to obtain altitude difference(s) between the floors) in the structure $20_2$, or with the base station 14, or obtained by the processor 21 communicating with the memory 22 that stores the altitude threshold $A_{th}$. The altitude threshold $A_{th}$ may be the same or different for different regions within the structure $20_2$, e.g., a first value if the mobile device's last determined/disambiguated region is the first floor and a second value, different from the first value, if the mobile device's last determined/disambiguated region is the second floor. Alternatively, the altitude threshold $A_{th}$ may be fixed, e.g., if programmed during manufacture of the mobile device 12.

At stage 154, the mobile device 12 determines its present position and present region in which the mobile device 12 resides, triggers a passive measurement, and sets a passive measurement rate to high. The region determination module 112 determines the mobile device's region in the structure $20_2$, disambiguating regions as appropriate, e.g., if the mobile device 12 receives signals from APs 19 in different regions. The position determination module 114 determines the mobile device's position, e.g., using information from active and/or passive measurements with one or more of the APs 19, the location(s) of the one or more APs 19, and one or more known techniques such as trilateration. The processor 21 triggers a passive measurement, e.g., for use in determining the mobile device's position, and sets (i.e., the measurement module sets, or the means for measuring includes means for setting) a rate of passive measurements to a relatively high value. For example, the processor 21 may be configured to set the passive measurement rate to a first frequency value, a second frequency value, or off, with the first frequency value being higher than the second frequency value such that a first frequency is a relatively higher frequency and a second frequency is a relatively lower frequency. This example is for regularly-spaced in time passive measurements, but rates for non-regularly-spaced measurements may also be set, or parameters inducing different rates set (similarly, a low non-regularly-spaced or regularly-spaced measurement rate can be set at stage 162 discussed below).

At stage 156, an inquiry is made as to whether the mobile device 12 is in an area of unreliable pressure readings. The processor 21 determines (e.g., using a map of the structure $20_2$) whether the position of the mobile device 12 corresponds to an area of the structure $20_2$ known (e.g., as indicated on a map of the structure $20_2$) to have unreliable pressure readings, e.g., because there is an entity affecting pressure in the area such as a vent or air-conditioning unit. If the processor 21 determines that the mobile device 12 is in an area where pressure measurements taken by the pressure sensor 32 are unreliable (e.g., subject to frequent change), then the process 150 loops at stage 156. If the processor 21 determines that the mobile device 12 is not in an area where pressure measurements taken by the pressure sensor 32 are unreliable, then the process 150 proceeds to stage 158.

At stage 158, the mobile device 12 measures the present pressure and determines and stores a reference altitude $A_r$. The pressure sensor 32 measures the pressure at the mobile device 12 and converts this pressure to an altitude using the reference pressure. If this altitude is stable, then the measurement module 110 stores the altitude (i.e., an indication of the stable altitude) in the memory 22 as more fully discussed below with respect to FIG. 10. In this example, the stable altitude is stored as a reference altitude $A_r$.

At stage 160, an inquiry is made as to whether the mobile device 12 is unlikely to move between regions of the structure $20_2$ soon. In this example, the processor 21 determines whether the mobile device 12 is near/proximate or displaced from a vertical transition of the structure $20_2$ and whether the position of the mobile device 12 is accurately known. For example, the processor 21 determines whether the position of the mobile device 12 is outside a threshold distance of any vertical transition of the structure $20_2$, with the mobile device 12 being unlikely to move between vertically displaced regions soon if the mobile device 12 is further than the threshold distance from any such vertical transition. Further, the processor 21 determines whether the position of the mobile device 12 is confidently/accurately known, e.g., whether a confidence in the position determined at stage 154 (or stage 172 discussed below) is greater than a threshold confidence. If the position of the mobile device 12 is confidently/accurately known, and outside of the threshold distance from a vertical transition, then the processor 21 determines that the mobile device is unlikely to move between regions of the structure $20_2$ soon, and the process 150 proceeds to stage 162. If the position of the mobile device 12 is not confidently/accurately known and/or inside of the threshold distance from a vertical transition, then the processor 21 determines that the mobile device is not unlikely to move between regions of the structure $20_2$ soon, and the process 150 proceeds to stage 164.

At stage 162, the mobile device 12 sets a passive measurement rate to low. The processor 21 sets (effectively either changes if high, or leaves alone if already low) a rate of passive measurements (a rate at which the mobile device 12 will perform passive measurements) to a relatively low rate (e.g., a second rate of first and second rates where the first rate is higher than the second rate). That is, the measurement module 110 is configured to reduce (the means for measuring includes means for reducing) a frequency of passive measurements in response to the mobile device being unlikely to move between regions of the structure soon. The relatively low rate would reduce power consumption relative to a higher rate while detecting information often enough to help ensure a high quality user experience. For example, the relatively low rate could be once every 30 seconds. Alternatively, the processor 21 may turn passive measurements off (i.e., the means for measuring includes means for turning off recurring passive measurements and stage 162 potentially includes turning off recurring passive measurements) pending a trigger to induce a passive measurement and/or start recurring passive measurements. From stage 162, the process 150 proceeds to stage 166 discussed below.

At stage 164, the mobile device 12 sets a passive measurement rate to high. The processor 21 sets (effectively either changes if low, or leaves alone if already high) the rate of passive measurements to a relatively high rate (e.g., the first rate of the first and second rates), e.g., once every six (6) seconds, to provide a compromise between power consumption and delay between a region change and region detection to ensure a high quality user experience.

At stage 166, the mobile device 12 measures the present pressure, converts this pressure to an altitude, and stores this altitude as a present altitude $A_n$ for comparison with the reference altitude $A_r$. The pressure sensor 32 measures the pressure at the mobile device 12 and the measurement module 110 converts the pressure to altitude and stores this altitude (i.e., an indication of this altitude) in the memory 22.

At stage 168, an inquiry is made as to whether the mobile device 12 is in an area of unreliable pressure readings. Similar to stage 156 discussed above, the processor 21 determines whether the position of the mobile device 12 corresponds to an area of the structure $20_2$ known to have unreliable pressure readings. If the processor 21 determines that the mobile device 12 is in an area where pressure measurements taken by the pressure sensor 32 are unreliable, then the region determination module 112 disregards (at least for purposes of the process 150) at least one of the pressure measured, or the corresponding altitude determined, at stage 166, and the process 150 proceeds to stage 172, bypassing stage 170. The processor 21 may also turn pressure measurements off until the mobile device 12 is not in an area (i.e., outside of any area) of unreliable pressure. If the processor 21 determines that the mobile device 12 is not in an area where pressure measurements taken by the pressure sensor 32 are unreliable, then the process 150 proceeds to stage 170.

At stage 170, an inquiry is made as to whether a magnitude of an altitude difference (delta) between the present altitude $A_n$ and the reference altitude $A_r$ is indicative of a region change, i.e., the mobile device 12 moving between first and second regions of the structure 20, with the first and second regions being vertically displaced with respect to each other. The processor 21 determines a magnitude of a difference between the present altitude $A_n$ and the reference altitude $A_r$ and compares this value with the altitude threshold $A_{th}$. The altitude threshold Ath is a region-change-indicative magnitude in that if the magnitude of the difference is greater than the altitude threshold $A_{th}$ ($|A_n-A_r|>A_{th}$), then the altitude difference is indicative of the mobile device 12 having changed regions from the most-recently disambiguated region (i.e., the region the mobile device 12 was determined to be in when the processor 21 most recently performed region disambiguation). In this case, the process 150 returns to stage 154 for position determination, including region disambiguation if appropriate. If the magnitude of the difference of the present altitude $A_n$ and the reference altitude $A_r$ is not greater than the altitude threshold $A_{th}$, then the altitude difference is indicative of the mobile device 12 not having changed regions from the most-recently disambiguated region. In this case, the process 150 proceeds to stage 172 for position determination. Alternatively, the comparison made during this stage could be whether the magnitude difference between the present altitude $A_n$ and the reference altitude $A_r$ is greater than or equal to the altitude threshold $A_{th}$. Alternatively still, the comparison made during this stage could be whether an altitude change rate exceeds or falls below a threshold rate. Further, the determination at stage 170 may include some time delay, e.g., being made for the altitude change or altitude change rate over a period of time, e.g., three seconds, before returning to stage 154. This provides some hysteresis to guard against numerous transition indications if the change or change rate is near the threshold value or if there is rapid altitude change over multiple regions (e.g., floors), e.g., due to transit in an elevator. The hysteresis may also take the form of a variable threshold, e.g., once a first threshold value is exceeded, if the altitude drops below a second threshold value, that is less than the first threshold value, before the position of the mobile device 12 is determined/disambiguated, then the position determination/disambiguation at stage 154 may be terminated, with the process 150 proceeding to stage 156.

At stage 172, the mobile device 12 determines its position. The position determination module 114 determines the mobile device's position, e.g., using information from active and/or passive measurements with one or more of the APs 19, the location(s) of the one or more APs 19, and one or more known techniques such as trilateration. The process 150 then returns to stage 158 where a new, stable, reference altitude will be determined.

Figure 10:
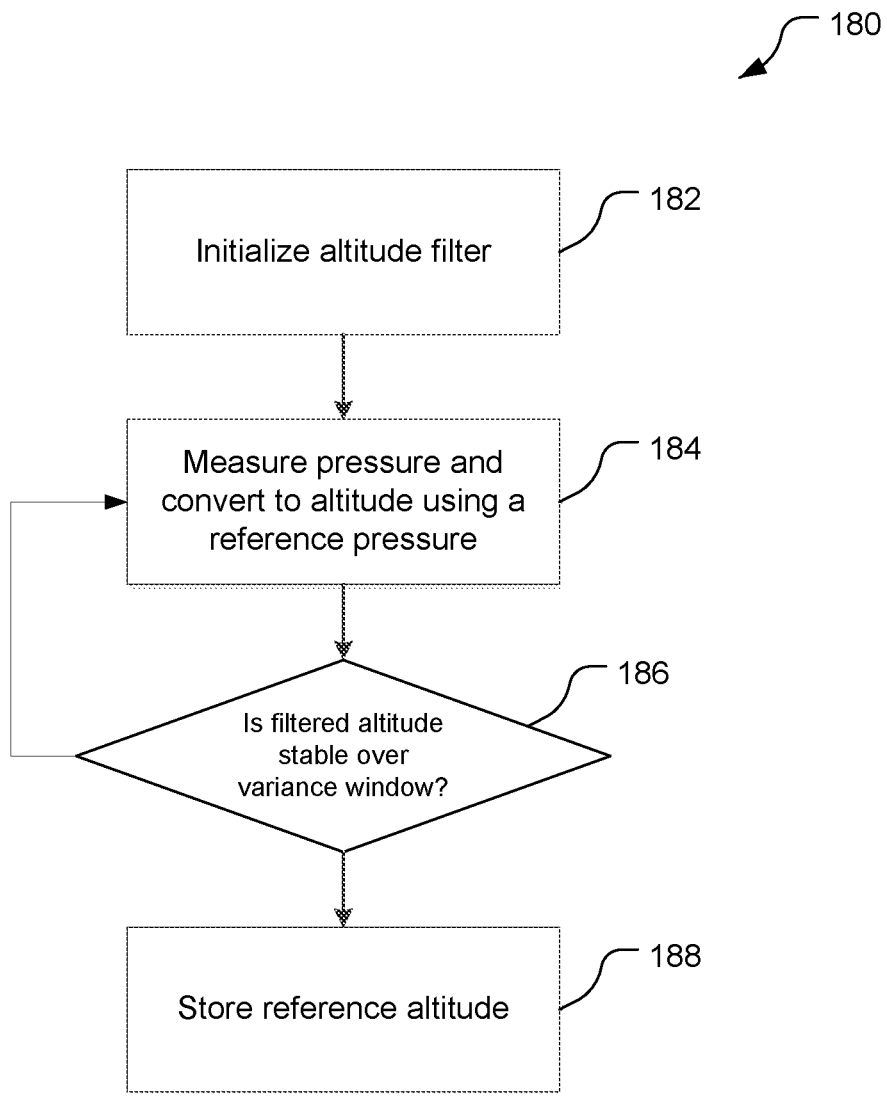
FIG. 10 is a block flow diagram of a process of determining a reference altitude.

Referring to FIG. 10, with further reference to FIGS. 1-9, a process 180 of determining and storing a reference altitude includes the stages shown. The process 180 is, however, an example only and not limiting. The process 180 can be altered, e.g., by having stages altered, added, removed, combined, and/or performed concurrently.

At stage 182, an altitude filter in the mobile device 12 is initialized. The filter is initialized with one or more appropriate parameters, e.g., noise variance, to implement a low-pass filter. This stage may performed only the first time that the process 180 is performed, or only the first time that the process 182 is performed in a particular structure 20.

At stage 184, the pressure is measured and converted to an altitude using a reference pressure. The pressure sensor 32 measures the pressure at the mobile device 12 and the processor 21 converts this pressure to an altitude using a reference pressure. The reference pressure is an arbitrary pressure and may be arbitrarily chosen, may be received from a BTS 14, may be the first pressure measured by the pressure sensor 32 after the mobile device 12 enters the structure 20, or a pressure determined or chosen in some other way.

At stage 186, an inquiry is made as to whether the determined altitude is stable. The determined altitude is filtered by the altitude filter initialized at stage 182. For example, the altitude filter may collect altitude values over a period of time such as 15 seconds. If altitude values are not available for the entire period of time, or if the variance of the altitude over the time period exceeds (or, alternatively, meets or exceeds) a threshold variance value, then the process 180 returns to stage 184 where further pressure measurements and altitude determinations are performed. If altitude values are available for the entire period of time, and the variance of the altitude over the time period is less than or equal to (or, alternatively, is less than) the threshold variance value, then the process 180 proceeds to stage 188 where the present altitude (or an altitude associated with the present altitude, e.g., an average of the altitude over the time period) is stored as a reference altitude $A_r$.

Figure 11:
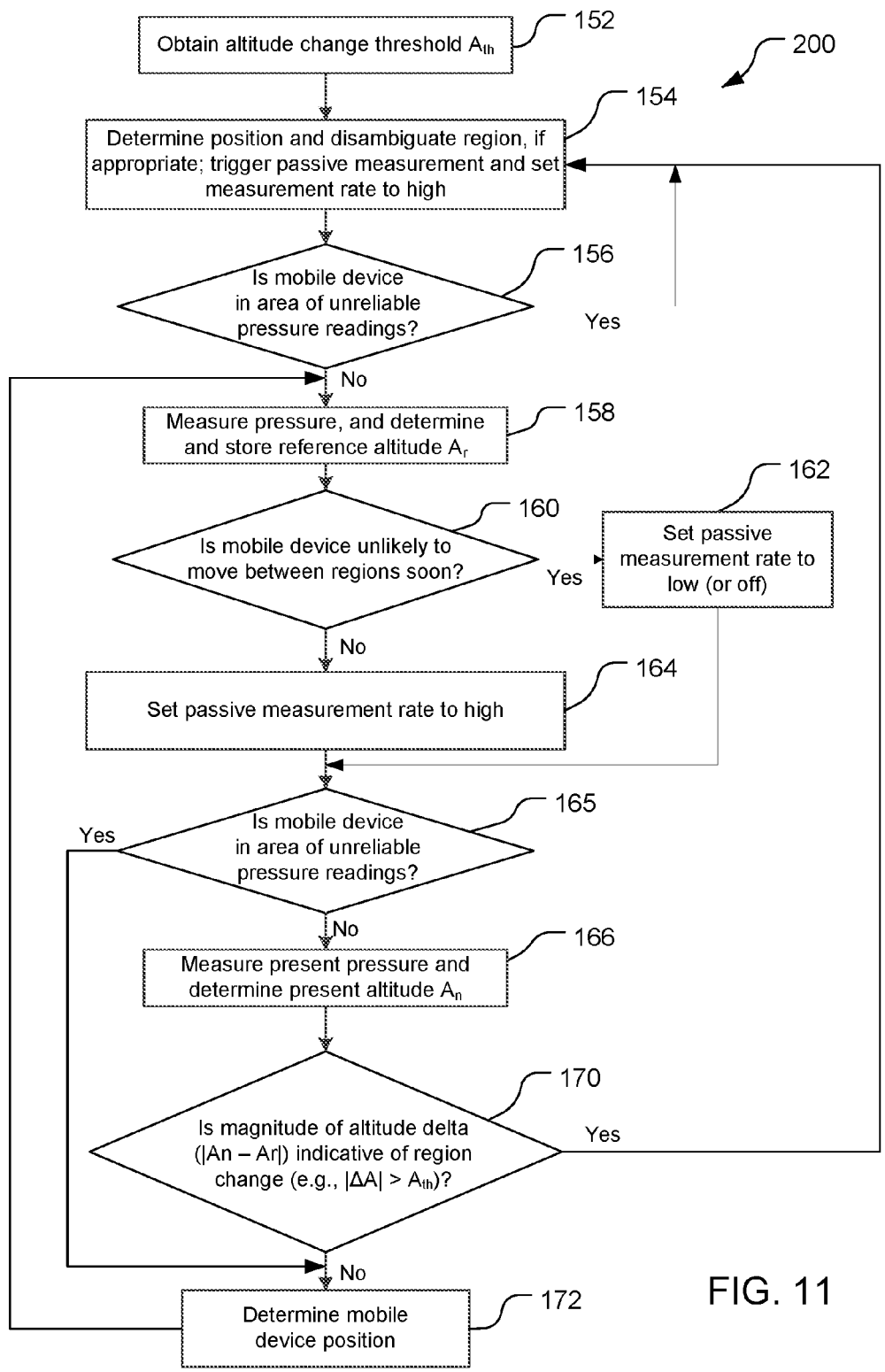
FIG. 11 is a block flow diagram of another process of controlling region determination.

Referring to FIG. 11, with further reference to FIGS. 1-9, a process 200 of controlling region determination by the mobile device 12 while within the structure $20_2$ includes the stages shown. The process 200 is another example detailed implementation of the process 120. The process 200 is, however, an example only and not limiting. The process 200 can be altered, e.g., by having stages altered, added, removed, rearranged, combined, and/or performed concurrently. For example, stage 152 could be eliminated.

The process 200 is very similar to the process 150 shown in FIG. 8. A difference between the process 200 and the process 150 is that in the process 200, after stage 162, the process 200 proceeds to stage 165 while in the process 150, after stage 162, the process 150 proceeds to stage 166 for measurement of present pressure and determining the present altitude. Stage 165 is similar to stage 168 of the process 150. If at stage 165 the processor 21 determines that the mobile device 12 is in an area of unreliable pressure readings, then the process 200 bypasses stages 166 and 170 so that a pressure measurement is not taken, while in the process 150 the pressure measurement is taken at stage 166 but disregarded (or the determined altitude is disregarded) if the processor 21 determines that the mobile device 12 is in an area of unreliable pressure readings.

Other Considerations

One or more dedicated devices may be provided that measure pressure and send communications indicating the pressures, and information from which the region can be determined, to the server 18 and/or the mobile devices 12.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method operational on a mobile device for controlling region determination of the mobile device, the method comprising:
   determining a present pressure at the mobile device;
   determining a position of the mobile device;
   determining, using the position of the mobile device, whether the mobile device is located in an area of unreliable pressure measurements;
   in response to determining that the mobile device is in an area of unreliable pressure measurements, either (1) disregarding the present pressure or (2) disregarding a present altitude determined from the present pressure;
   in response to determining that the mobile device is not in an area of unreliable pressure measurements, determining, based on the present pressure and a reference pressure, that the mobile device moved from a first region to a second region within a structure, the first region and the second region being different regions of the structure and vertically displaced from each other; and
   performing region determination in response to determining that the mobile device moved from the first region to the second region.

2. The method of claim 1 further comprising:
   receiving an indication of an area of unreliable pressure from an access point within the structure,
   wherein determining whether the mobile device is located in an area of unreliable pressure measurements uses the indication of the area of unreliable pressure.

3. The method of claim 2, wherein the indication of the area of unreliable pressure comprises map information regarding the structure.

4. The method of claim 1 further comprising:
   reducing a frequency of passive measurements by the mobile device in response to determining that the mobile device is unlikely to move between regions of the structure within a predetermined period of time.

5. The method of claim 4, wherein determining that the mobile device is unlikely to move between regions of the structure within the predetermined period of time comprises determining that a present position of the mobile device is displaced from a vertical transition of the structure by more than a threshold distance.

6. The method of claim 1 further comprising:
   performing passive measurements at a first rate or a second rate, with the first rate being higher than the second rate; and
   setting a rate of passive measurements by the mobile device to the first rate, in response to determining that the mobile device is within a threshold distance of a vertical transition of the structure or that the mobile device moved from being in the first region to being in the second region, or a combination thereof.

7. The method of claim 1 further comprising:
   turning off recurring passive measurements by the mobile device in response to determining that the mobile device is displaced from a vertical transition of the structure by more than a threshold distance.

8. The method of claim 7 further comprising:
   turning on the recurring passive measurements in response to determining that the mobile device moved from being in the first region to being in the second region.

9. A mobile device comprising:
   a pressure sensor configured to measure a present pressure at the mobile device; and
   a processor communicatively coupled to the pressure sensor and configured to:
      determine a position of the mobile device;
      determine, using the position of the mobile device, whether the mobile device is located in an area of unreliable pressure measurements;
      in response to determining that the mobile device is in an area of unreliable pressure measurements, either (1) disregard the present pressure or (2) disregard a present altitude determined from the present pressure;
      in response to determining that the mobile device is not in an area of unreliable pressure measurements, determine, based on the present pressure and a reference pressure, that the mobile device moved from a first region to a second region within a structure, the first region and the second region being different regions of the structure and vertically displaced from each other; and
      perform region determination in response to determining that the mobile device moved from the first region to the second region.

10. The mobile device of claim 9, wherein the processor is further configured to:
    receive an indication of an area of unreliable pressure from an access point within the structure,
    wherein to determine whether the mobile device is located in an area of unreliable pressure measurements, the processor uses the indication of the area of unreliable pressure.

11. The mobile device of claim 10, wherein the indication of the area of unreliable pressure comprises map information regarding the structure.

12. The mobile device of claim 9, wherein the processor is further configured to:
    reduce a frequency of passive measurements by the mobile device in response to a determination that the mobile device is unlikely to move between regions of the structure within a predetermined period of time.

13. The mobile device of claim 12, wherein the processor is further configured to:
    determine that the mobile device is unlikely to move between regions of the structure within the predetermined period of time by determining that a present position of the mobile device is displaced from a vertical transition of the structure by more than a threshold distance.

14. The mobile device of claim 9, wherein the processor is further configured to:
    perform passive measurements at a first rate or a second rate, with the first rate being higher than the second rate; and
    set a rate of passive measurements by the mobile device to the first rate, in response to determining at least one of that the mobile device is within a threshold distance of a vertical transition of the structure or that the mobile device moved from being in the first region to being in the second region.

15. The mobile device of claim 9, wherein the processor is further configured to:
turn off recurring passive measurements by the mobile device in response to determining that the mobile device is displaced from a vertical transition of the structure by more than a threshold distance.

16. The mobile device of claim 15, wherein the processor is further configured to:
turn on the recurring passive measurements in response to the mobile device having moved from being in the first region to being in the second region.

17. A mobile device comprising:
a pressure sensor configured to measure a present pressure at the mobile device;
position determination means for:
determining a position of the mobile device; and
determining, using the position of the mobile device, whether the mobile device is located in an area of unreliable pressure measurements;
region determination means, communicatively coupled to the pressure sensor and the position determination means, for:
in response to determining that the mobile device is in an area of unreliable pressure measurements, either (1) disregarding the present pressure or (2) disregarding a present altitude determined from the present pressure;
in response to determining that the mobile device is not in an area of unreliable pressure measurements, determining, based on the present pressure and a reference pressure, that the mobile device moved from a first region to a second region within a structure, the first region and the second region being different regions of the structure and vertically displaced from each other; and
performing region determination in response to determining that the mobile device moved from the first region to the second region.

18. The mobile device of claim 17, wherein the position determination means includes:
means for receiving an indication of an area of unreliable pressure from an access point within the structure; and
means for determining whether the mobile device is located in an area of unreliable pressure measurements using the indication of the area of unreliable pressure.

19. The mobile device of claim 17, wherein the indication of the area of unreliable pressure comprises map information regarding the structure.

20. The mobile device of claim 17 further comprising:
measuring means for reducing a frequency of passive measurements in response to a determination that the mobile device is unlikely to move between regions of the structure within a predetermined period of time.

21. The mobile device of claim 20, the position determination means includes:
means for determining that the mobile device is unlikely to move between regions of the structure within the predetermined period of time by determining that a present position of the mobile device is displaced from a vertical transition of the structure by more than a threshold distance.

22. The mobile device of claim 17, wherein the measuring means includes:

means for performing passive measurements at a first rate or a second rate, with the first rate being higher than the second rate; and
means for setting a rate of passive measurements by the mobile device to the first rate, in response to determining at least one of that the mobile device is within a threshold distance of a vertical transition of the structure or that the mobile device moved from being in the first region to being in the second region.

23. The mobile device of claim 17, wherein the measuring means includes:
means for turning off recurring passive measurements by the mobile device in response to determining that the mobile device is displaced from a vertical transition of the structure by more than a threshold distance; and
means for turning on the recurring passive measurements in response to the mobile device having moved from being in the first region to being in the second region.

24. A processor-readable non-transitory storage medium of a mobile device, the storage medium comprising processor-readable instructions configured to cause a processor to:
determine a position of the mobile device;
determine, using the position of the mobile device, whether the mobile device is located in an area of unreliable pressure measurements;
in response to determining that the mobile device is in an area of unreliable pressure measurements, either (1) disregard a present pressure measured by a pressure sensor or (2) disregard a present altitude determined from the present pressure;
in response to determining that the mobile device is not in an area of unreliable pressure measurements, determine, based on the present pressure and a reference pressure, that the mobile device moved from a first region to a second region within a structure, the first region and the second region being different regions of the structure and vertically displaced from each other; and
perform region determination in response to determining that the mobile device moved from the first region to the second region.

25. The processor-readable non-transitory storage medium of claim 24, further comprising processor-readable instructions configured to cause the processor to:
receive an indication of an area of unreliable pressure from an access point within the structure,
wherein the instructions configured to determine whether the mobile device is located in an area of unreliable pressure measurements are further configured to use the indication of the area of unreliable pressure.

26. The processor-readable non-transitory storage medium of claim 25, wherein the indication of the area of unreliable pressure comprises map information regarding the structure.

27. The processor-readable non-transitory storage medium of claim 24, further comprising processor-readable instructions configured to cause the processor to:
reduce a frequency of passive measurements by the mobile device in response to a determination that the mobile device is unlikely to move between regions of the structure within a predetermined period of time.

28. The processor-readable non-transitory storage medium of claim 27, further comprising processor-readable instructions configured to cause the processor to:
determine that the mobile device is unlikely to move between regions of the structure within the predetermined period of time by determining that a present position of the mobile device is displaced from a vertical transition of the structure by more than a threshold distance.

29. The processor-readable non-transitory storage medium of claim 24, further comprising processor-readable instructions configured to cause the processor to:
perform passive measurements at a first rate or a second rate, with the first rate being higher than the second rate; and
set a rate of passive measurements by the mobile device to the first rate, in response to determining at least one of that the mobile device is within a threshold distance of a vertical transition of the structure or that the mobile device moved from being in the first region to being in the second region.

30. The processor-readable non-transitory storage medium of claim 24, further comprising processor-readable instructions configured to cause the processor to:
turn off recurring passive measurements by the mobile device in response to determining that the mobile device is displaced from a vertical transition of the structure by more than a threshold distance; and
turn on the recurring passive measurements in response to the mobile device having moved from being in the first region to being in the second region.

\* \* \* \* \*